(12) United States Patent
Keat et al.

(10) Patent No.: US 11,170,513 B2
(45) Date of Patent: *Nov. 9, 2021

(54) OBJECT SURFACE MATCHING WITH A TEMPLATE FOR FLIGHT PARAMETER MEASUREMENT

(71) Applicant: RAPSODO PTE. LTD., Singapore (SG)

(72) Inventors: Kelvin Yeo Soon Keat, Singapore (SG); Batuhan Okur, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,904

(22) Filed: Mar. 17, 2020

(65) Prior Publication Data
US 2020/0265593 A1 Aug. 20, 2020

Related U.S. Application Data

(62) Division of application No. 15/179,463, filed on Jun. 10, 2016, now Pat. No. 10,593,048.

(60) Provisional application No. 62/276,129, filed on Jan. 7, 2016.

(51) Int. Cl.
*G06T 7/246* (2017.01)
*G06T 7/73* (2017.01)

(52) U.S. Cl.
CPC ............... *G06T 7/248* (2017.01); *G06T 7/74* (2017.01); *G06T 2207/10016* (2013.01); *G06T 2207/30224* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,233,007 B1 | 5/2001 | Carlborn | |
| 7,346,197 B2 | 3/2008 | Miki | |
| 9,519,003 B1 | 12/2016 | Okur | |
| 10,593,048 B2 * | 3/2020 | Keat | G06T 7/248 |
| 2006/0008116 A1 | 1/2006 | Kiraly | |
| 2014/0004967 A1 | 1/2014 | Jang | |
| 2014/0163915 A1 | 6/2014 | Baek | |
| 2015/0260512 A1 | 9/2015 | Greiner | |
| 2015/0328516 A1 | 11/2015 | Coza | |

(Continued)

*Primary Examiner* — Vikkram Bali
(74) *Attorney, Agent, or Firm* — Maschoff Brennan

(57) ABSTRACT

A method of object surface matching includes identifying an object in-flight in an image; identifying a feature on the object that is in a first spatial position; comparing the feature with set of template images; identifying a first template image in the set of template images that matches the feature on the object that is in the first spatial position; determining first coordinates for the first spatial position based on the first template image; identifying a second image of the object that includes the feature on the object that is in a second spatial position; identifying a second template image in the set of template images that matches the feature on the object that is in the second spatial position; determining second coordinates for the second spatial position based on the second template image; and generating a spin value for the object based on the first and second coordinates.

20 Claims, 14 Drawing Sheets

(56) References Cited

U.S. PATENT DOCUMENTS

2016/0110880 A1 4/2016 Keat
2016/0180544 A1 6/2016 Hohteri

* cited by examiner

X 302
Y 303
Z 304

X 306
Y 307
Z 308

(1)

OBJECT SURFACE MATCHING WITH A TEMPLATE FOR FLIGHT PARAMETER MEASUREMENT

RELATED APPLICATION

This application is a division of Ser. No. 15/179,463 filed on Jun. 10, 2016 which claims priority to U.S. Provisional Patent Application No. 62/276,129, filed Jan. 7, 2016, which is herein incorporated by reference.

FIELD

Embodiments described herein are related to object surface matching with a template for flight parameter measurement.

BACKGROUND

Many sports and other activities may include sending an object through the air. The object may be any object such as a baseball, golf ball, or another object. The object may be thrown or hit by a person or launched by a device. Often, a speed of the object may be measured. Because of limitations with currently available technology, other measurements of the object while in-flight may be difficult.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
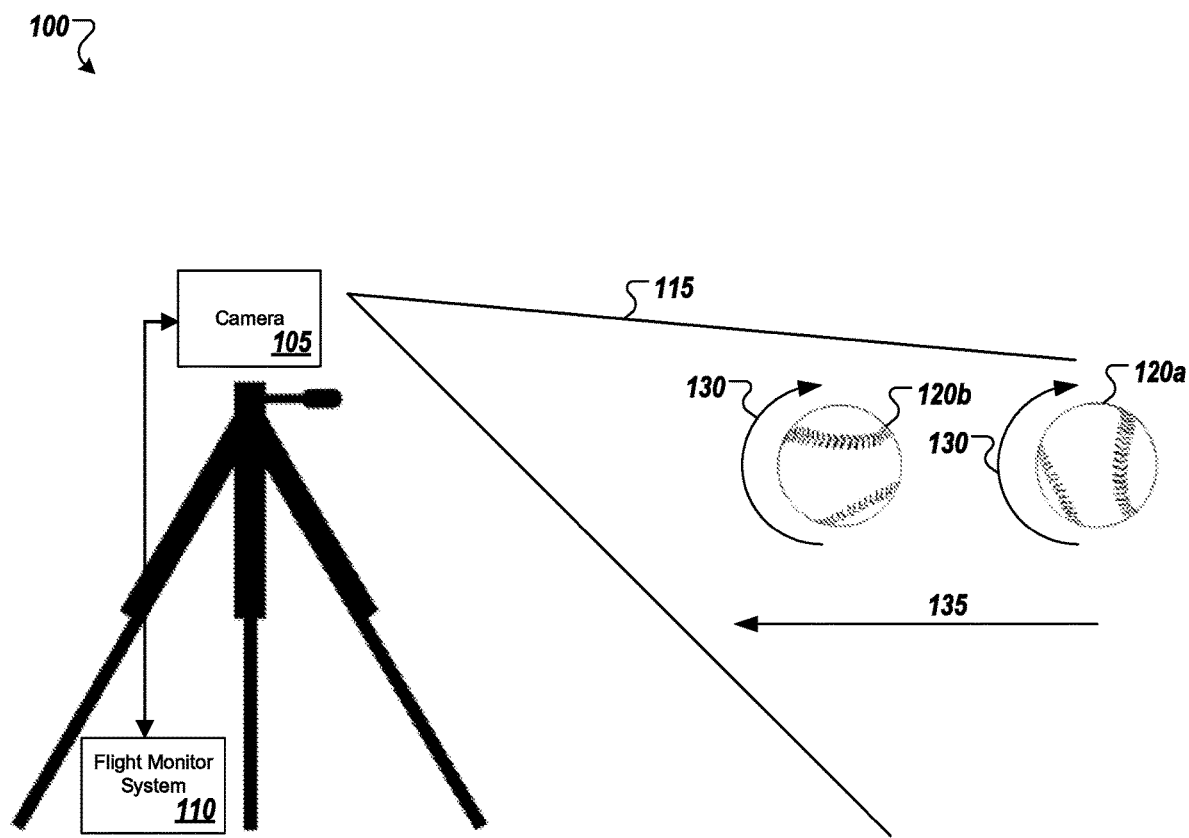
FIG. 1 illustrates an example system for object surface matching with a template for flight parameter measurement.

Flight parameter measurement of objects may provide additional information pertaining to the object and/or an item that put the object into flight. For simplicity in explanation, sports balls are described herein as example objects to be measured while in flight. It is contemplated that the systems and methods described herein may apply to any object that is in flight and for any purpose.

With recent advancement in sensor technology and computer speeds, image-based flight measurement devices may find uses in new unexplored areas, such as sports. A camera may be used to measure various flight parameters of an object in flight, such as speed, launch direction, spin rate and/or spin axis. A flight monitor system may use the flight parameters to derive other parameters, such as a carry distance, hang time, and maximum height and side of the trajectory. In a game of baseball, for example, a position where a baseball crosses a strike zone and a break direction may be parameters of interest.

Conventional systems are often limited in their ability to accurately and precisely measure and determine other parameters of objects moving in high speed. For example, conventional systems may be limited in their ability to precisely measure a spin rate and/or a spin axis of an object in flight. Without being able to detect an accurate spin rate and/or a spin axis, other parameters based on the spin rate and/or a spin axis may also be inaccurate. For example, without accurate spin rate and/or a spin axis, a reconstruction of a 3D flight path of a baseball likewise may not be accurate. Conventionally, spin is often measured by an amount of rotation of a ball relative to itself at different times and/or positions. Often, spin is often measured by an amount of rotation between one image of ball as compared to a second image of the same ball by matching similar points or regions from one image to the other. Features such as dimples, blemishes or seams on a baseball may often be used to find shift in angular coordinates from image to image. This approach has some limitations. For example, an overlapping or common region from one image to the other should be sufficient so the overlapping or common region can be identified on both images. The overlapping or common region may be used as a reference point to determine the differences between the ball in the images. Further, if the rotation rate of the ball is high, the frame rate of the camera capturing the images of the ball should be sufficiently high to ensure certain degree of overlapping in the overlapping or common region. Another disadvantage of conventional techniques includes a difficulty in determining which parts of the images are of interest and which parts of the images are not. One example would be in baseball, where an area surrounding the seams of the baseball may be the region of interest and the rest of the ball is background. Conventional systems may have difficulty tracking the seams and/or an area surrounding the seams of the baseball for various reasons.

Aspects of the present disclosure addresses these and other shortcomings of conventional techniques by providing object surface matching with a template for flight parameter measurement. The template may define a region of interest that may include a measurable feature, which may increase the accuracy of in-flight measurement of an object. Further, knowing the region of interest may decrease a false detection of a background as region of interest.

Further, flight parameter measurement of balls in sports may provide improvement cues and simulation to sports players and enthusiasts. In sports that involve launching an object in flight, the data generated from the measuring that flight may provide instant feedback on every shot which may be used for tuning of posture, mechanics and strategy of the player. The feedback may also provide a broader picture and overall trend changes over time. For example, the feedback may be used for injury prevention and/or long term improvement. In ball sports such as golf and baseball, the rotation of the ball, both in rate and in tilt axis, may provide information on how well a pitch is thrown or how a ball is being struck by a baseball bat or a golf club. In at least one embodiment, rotation measurement may be performed using at least one of Doppler radar or imaging. For imaging, if the shape and appearance of the object in flight is known, a template of different orientations of the object may be generated. Images of the object in flight may be compared against the template images to determine flight parameters of the object, such as rotation, speed, etc. Further, the images of the object in flight may be cropped to focus on a smaller region of interest which may reduce processing time and may reduce a load on the measurement system that otherwise may be caused by larger images and/or images with a high frame rate.

An example method of object surface matching with a template for flight parameter measurement may include capturing multiple images of an object in flight, cropping the object in flight from each image to exclude portions of the image that are outside a region of interest, and comparing the cropped images against pre-generated template images. In at least one embodiment, the cropped images may be compared against pre-generated template images by identifying a feature and/or an energy level of the object covered by an item of interest (e.g., a seam of a baseball) in different orientations. Further, the energy level of the object may be normalized by equalizing the energy level of the object with an energy level of the background. The method may also include enhancing a contrast of the object in flight by post processing and performing binarization to extract the region of interest. The method may also include generating a rotation vector from each image with respect to an arbitrary orientation and a relative rotation vector from one image to another. The method may also include generating multiple rotation vectors based on a symmetrical nature of the object and choosing a common rotation vector among different image pairs. In at least one embodiment, the method may include determining a photo taking timing. The photo taking timing may be orthogonal to the rotation rate of the object to avoid full or half rotation scenario. The method may include converting the rotation vectors into measurement in spin and spin axis with time information. The method may also include reconstructing a flight path of the object based on the spin and/or the spin axis. The method may further include performing a curve fitting technique to find a most accurate spin and spin axis by using the flight path.

FIG. 1 illustrates an example system 100 for object surface matching with a template for flight parameter measurement. The system 100 includes a camera 105, a flight monitor system 110 and an object of interest 120 which is illustrated as a baseball.

The camera 105 may be any camera capable of capturing images and/or video. The camera 105 may be mounted to a tripod, as illustrated. In at least one embodiment, the camera 105 may be mounted above an expected field of travel of the object of interest 120. As illustrated, the camera 105 is positioned such that a field of view 115 of the camera 105 is angled slightly downward with respect to a horizontal. As in the baseball example, the camera 105 may be configured to capture multiple images of the baseball 120 during the flight. The camera 105 may also be configured to capture bat motion in addition or in the alternative.

The object of interest 120a and 120b are instances of a single baseball 120 in different positions and at different times. The object of interest 120 may be rotating in any direction. As illustrated, the object of interest 120 is rotating in the direction of 130, as would some baseball pitches rotating in a back spin orientation. The object of interest 120 is traveling in the direction 135 towards the camera 105. The camera 105 may capture any number of images and may transmit captured images to the flight monitor system 110 for processing and display.

The flight monitor system 110 may be a computing device which may include, but is not limited to, a desktop computer, a laptop computer, a tablet computer, a mobile phone, a smartphone, a personal digital assistant (PDA), or other suitable computing device. The flight monitor system 110 may include a hardware server (or servers) that includes a processor, a memory, and network communication capabilities. The flight monitor system 110 may be communicatively coupled to the camera 105. In at least one embodiment, the flight monitor system 110 and the camera 105 are included in a single device. In at least one other embodiment, the flight monitor system 110 and the camera 105 are included in discrete devices. The flight monitor system 110 and the camera 105 may be connected via a wired or wireless connection. The wireless connection may include a network (not illustrated). In general, the network may include one or more wide area networks (WANs) and/or local area networks (LANs) that enable the flight monitor system 110 and the camera 105 to communicate with each other. In some embodiments, the network includes the Internet, including a global internetwork formed by logical and physical connections between multiple WANs and/or LANs. Alternately or additionally, the network may include one or more cellular RF networks and/or one or more wired and/or wireless networks such as, but not limited to, 802.xx networks, Bluetooth access points, wireless access points, IP-based networks, or the like. The network may also include servers that enable one type of network to interface with another type of network.

In at least one embodiment, the camera 105 sits behind an action zone (e.g., behind a catcher and possibly behind an umpire). The camera 105 may be triggered by radar when an incoming object of interest 120 is detected. The timing and position of the object of interest 120 being captured is provided by the radar measurement. A more complex radar system like FSK or modulated signal may be employed to increase the accuracy in timing and speed measurement. In an alternative embodiment, the camera 105 might be placed on the ground tilted up facing a launch source (e.g., a baseball pitcher). In at least one embodiment, due to the camera tilt, a same amount of tilt may be taken into account (e.g., added to or subtracted from) the measured spin axis to reflect the actual spin axis. The camera 105 and/or the flight monitor system 110 may measure speed, launch direction, spin and spin axis and may calculate other parameters, such as flight path, based on measured flight parameters. In at least one embodiment, the camera 105 may include a radar device. In at least one alternative embodiment, the radar may be separate from camera 105. The radar may also be in data communication with the camera 105.

The flight monitor system 110 may include a data storage (not illustrated) to store flight parameters and other calculated parameters. In at least one implementation, the data storage may include a memory (e.g., random access memory), a cache, a drive (e.g., a hard drive), a flash drive, a database system, or another type of component or device capable of storing data. The data storage may also include multiple storage components (e.g., multiple drives or multiple databases) that may span multiple computing devices (e.g., multiple server computers).

Figure 2:
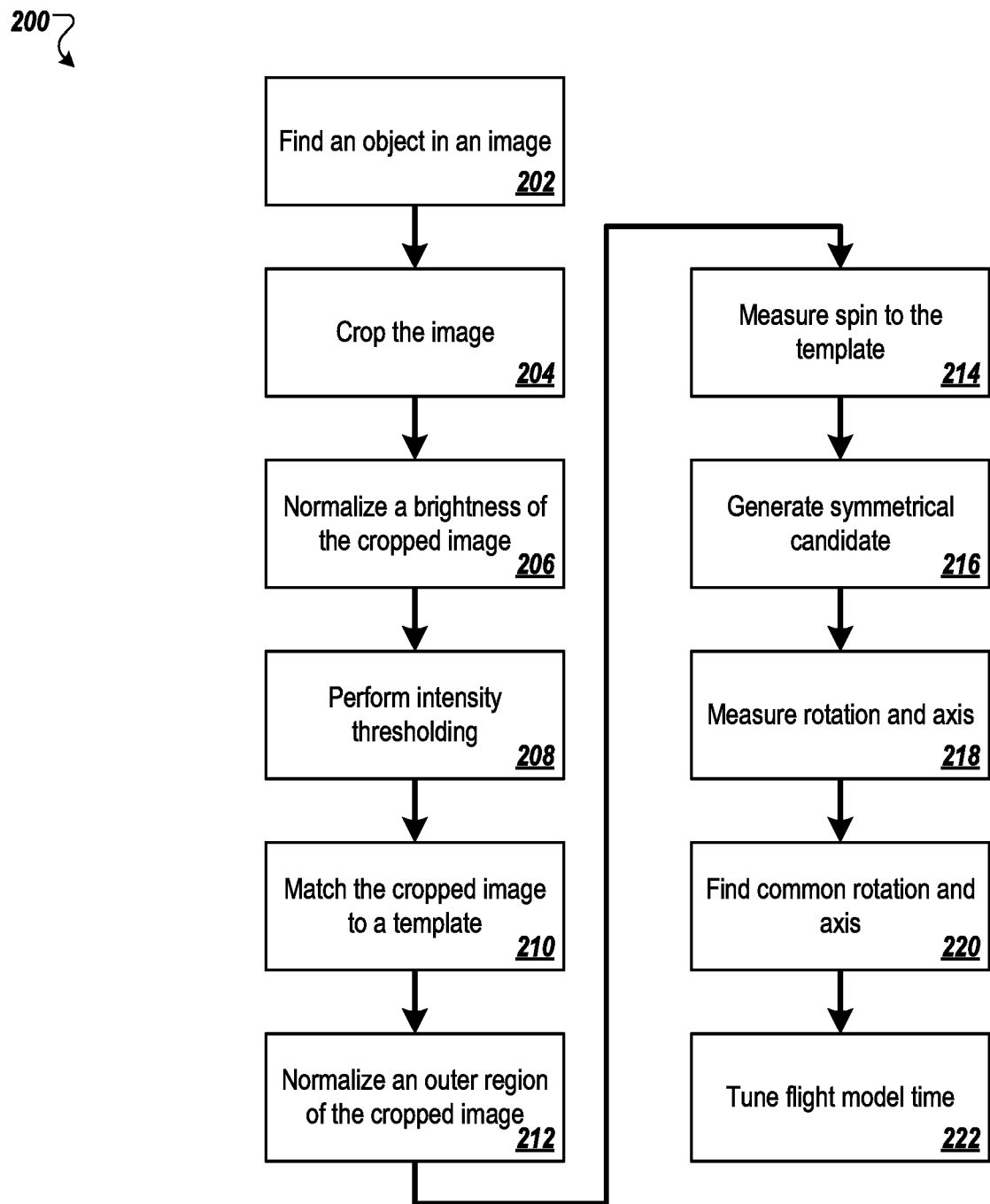
FIG. 2 illustrates an example flow diagram of a method related to object surface matching with a template for flight parameter measurement.

FIG. 2 illustrates an example flow diagram of a method related to object surface matching with a template for flight parameter measurement. The method may be performed by processing logic that may include hardware (circuitry, dedicated logic, etc.), software (such as is run on a general purpose computer system or a dedicated machine), or a combination of both, which processing logic may be included in the flight monitor system 110 or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Turning now to FIG. 2, the processing logic may find an object in an image at block 202. The image may have been captured by the camera 105 of FIG. 1. In at least one embodiment, during or after capture, the object in every image may be tracked. Position and measurements of the object may be taken in real time. For example, the camera 105 may send a live stream of an object in flight and the processing logic may measure and analyze the live stream of the object in real time. For example, the processing logic may identify center coordinates of the object, such as in x and y position, and also a radius and/or diameter of the object (e.g., baseball) may be measured. In an embodiment, one background image is taken much earlier before the object comes into the field of view of the camera, or much later to ensure that the ball has passed the vision of the camera. The difference between the background image and the other images will be the moving object in flight. All of this data may be stored in a data storage.

Once the information of the object is measured (e.g., the object is found), at block 204 the processing logic may crop the image of the object. In at least one embodiment, the image is cropped to a tightest fitting square or rectangle of a region of interest for further processing. The image then goes through normalization at block 206, which may be a lightweight brightness normalization. In an embodiment, the contrast of the object may be enhanced adaptively to reduce light uniformity related inaccuracy. The processing logic may identify a feature on the object that is in a first spatial position. Certain features of the object (e.g., seams of the baseball) may be highlighted because they may appear darker compared to the rest of object. The image may then be resized to a predetermined size for later processing. In at least one embodiment, template images may be generated based on this predetermined size. To extract the coordinates of the features of the object (e.g., the seams of the baseball), a thresholding operation may be performed at block 208 and the coordinates of a pixel that is below certain intensity level may be registered.

At block 210, the processing logic may match the image (or the cropped image) to a template. The processing logic may compare a feature of the object with a set of template images. The processing logic may identify a first template image in the set of template images that matches the feature on the object that is in the first spatial position. In at least one embodiment, the coordinates of the features of the object may be compared and matched against a database of templates that define feature orientation. The processing logic may determine coordinates for the first spatial position based on the first template image. The template may include multiple images of different views of an object. A template may be created for any object or any type of object. For example, a template may be created to define different views of a standard size baseball. Another template may be created to define different views of a standard size softball. In an embodiment, an energy level of the pixel of the feature coordinates in each orientation may be measured and compared against various template images. The lower the energy level is, the better the match with a particular template image it is. The more similar the energy spatial distribution is, the better the match with a particular template image it is.

At block 212, the processing logic may also normalize an outer region of the cropped image. For example, an energy level of a pixel just outside the feature (e.g., the seam) may also be measured by the processing logic for normalization purposes. Normalization is further described in conjunction with FIG. 6.

At block 214, the processing logic may measure spin of the object against the template using at least one feature in the region of interest. The processing logic may measure spin of the object against the template using feature orientation (e.g., by measuring orientation of the seam on the baseball and comparing the orientation to an image template). Each feature orientation as defined by an image in the template may be associated with a unique rotation number and may be defined in coordinates, such as in x, y and z axis coordinates with respect to an orientation defined by the template image. The relative rotation of the object in an image with respect to other images may be measured by comparing two sets of rotation numbers. The feature orientation that gives the best normalized fit may correspond to the correct feature orientation with respect to the images in the template. For example, the processing logic may identify a second image of the object that includes the feature on the object that is in a second spatial position. The processing logic may identify a second template image in the set of template images that matches the feature on the object that is in the second spatial position. The processing logic may determine second coordinates for the second spatial position based on the second template image. The processing logic may generate a spin value for the object based on the first coordinates and the second coordinates.

Once a relative rotation number is generated, at block 216 additional rotation numbers may be derived for symmetrical objects (e.g., a baseball). A different set of rotation numbers may be generated at block 218 for different image pairings. The one common rotation rate and rotation axis that is in every image pairing is deemed at block 220 as the right rotation rate and axis.

The spin and spin axis measurement may be further tuned at block 222 by generating a flight path with slightly varying spin and spin axis. The path that gives the best fit with the positions of the ball captured by camera or by radar is associated with the most accurate measurement of spin and spin axis.

Figure 3:
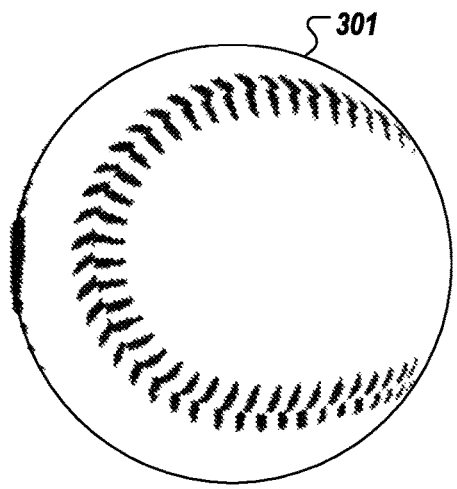
FIG. 3 illustrates an example generation of template images and coordinates of different object feature orientation.
Figure 3:
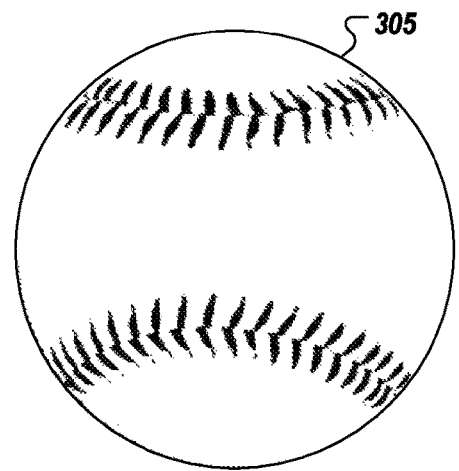
Figure 3:
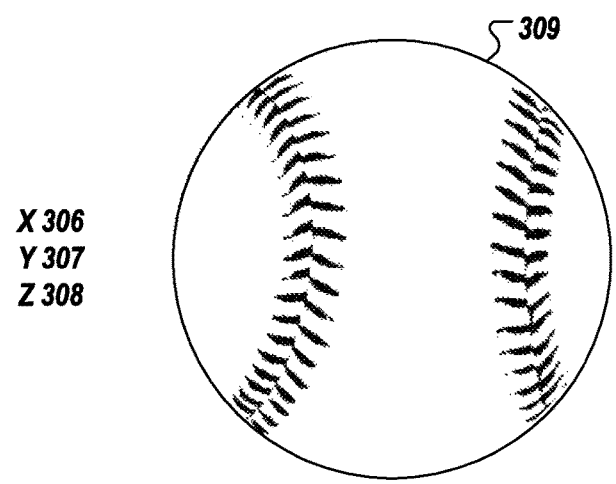

FIG. 3 illustrates an example generation of template images and coordinates of different object feature orientation. By way of example, the object is illustrated as a baseball and the feature in the region of interest is the baseball seams. In at least one embodiment, the template images may include course or fine detail of the features of the object. For example, a fine-detail template image may include details of the baseball seams (e.g., the "v" shaped stitching) while a fine-detail template image may include a course outline or silhouette of the baseball seams. Baseball orientation 301 is a predefined arbitrary orientation. In an embodiment, the baseball orientation 301 may be generated by mathematical model of wrapping a stitch pattern of a figure '8' on a sphere. In an alternative embodiment, an image of a known baseball may be post processed to extract the seam coordinates of the predefined seam orientation. In FIG. 3, baseball orientation 305 is generated by rotating baseball orientation 301 in the x direction 302, y direction 303, and/or in the z direction 304. An array of rotation numbers may be generated to cover all possible rotations in all directions. The size of the array may be determined based on an image resolution required for the template generation. A finer step size in any or all of the x direction 302, y direction 303, and/or in the z direction 304 may yield a bigger database of image templates. Each baseball orientation may be associated with an x, y and z orientation number. Baseball orientation 309 illustrates another example seam orientation with coordinates 306, 307 and 308 being the rotation number in x, y and z axis of the arbitrary seam orientation 301 to 309. The coordinates of each seam pixel may also be registered in the template. The size of the object may be a fixed number such that subsequent comparison with a same type of object ball (e.g., another baseball of the same size) may be performed under the same conditions. The template may be stored in a file, folder or archive before running the feature tracing. This may decrease the run time calculation load of the system. In an alternative embodiment, the template is generated in runtime. For example, a coarse spin and spin axis may be measured first before a finer resolution comparison is performed with smaller number of feature templates.

Figure 4:
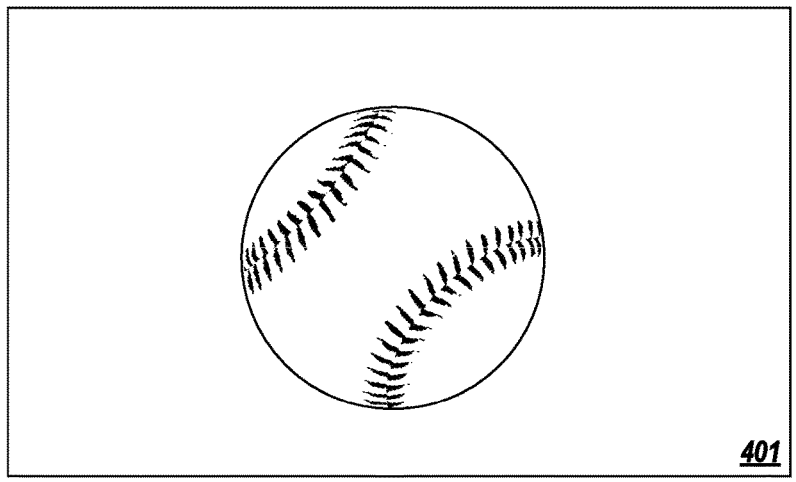
FIG. 4 illustrates example post processing operations of a flight monitor system.
Figure 4:
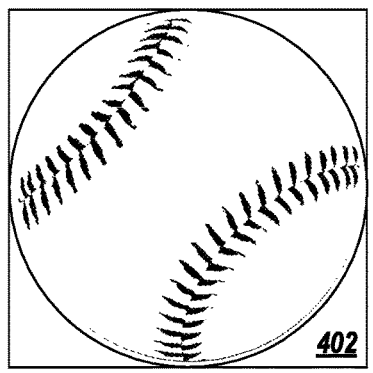
Figure 4:
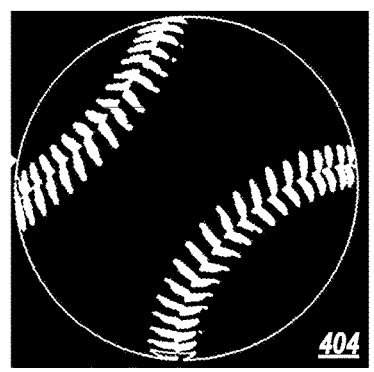
Figure 4:
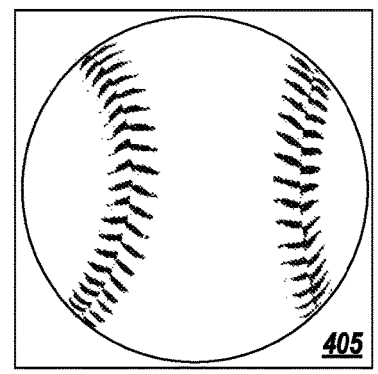
Figure 4:
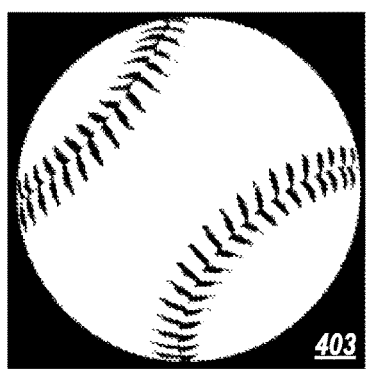
Figure 4:
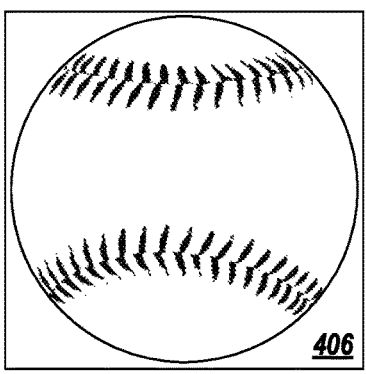
Figure 4:
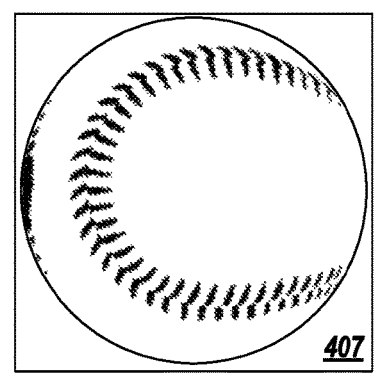

FIG. 4 illustrates example post processing operations of a flight monitor system, such as the flight monitor system 110 of FIG. 1. Image 401 may be an image of an object (e.g., a baseball) that was captured by a camera, such as the camera 105 of FIG. 1. The flight monitor system 110 may crop the image 401 to extract the object from the rest of the image. The flight monitor system 110 may locate the object in pixel x and y and the flight monitor system 110 may measure an outside dimension of the object, such as a radius or a diameter of a baseball. In an embodiment, the object cropping may be performed by the camera 105 and only the cropped image is transmitted to the flight monitor system 110, which may reduce transmission time and/or data bandwidth. In an alternative embodiment, the camera 105 may send images to the flight monitor system 110 in full and the cropping is done by the flight monitor system 110.

Once the image of the object is cropped to the tightest fitting square or rectangle of a region of interest, as illustrated in image 402, the flight monitor system 110 may perform light normalization and/or contrast enhancement. The output of this operation may be image 403 where the feature (e.g., baseball seams) may be more visible with respect to the bright surface on the object which may be the background. In an embodiment, the flight monitor system 110 may enhance the contrast of the object adaptively by equalizing a histogram locally. This may reduce a lighting difference on different areas of the object due to an uneven lighting of the environment in which the camera 105 captured the image 401. Once the contrast is enhanced, the flight monitor system 110 may perform a binarization operation on the image 403 to extract the seam from the bright background. The coordinates of dark pixels is registered. In the alternative embodiment, the subsequent comparison operations are performed on image 403 without any binarization. The flight monitor system 110 may compare the binary image 404 (or the image 403) with multiple seam orientations as in template images 405, 406 and 407. As described above, the template images may include course or fine detail of the features of the object.

Figure 5:
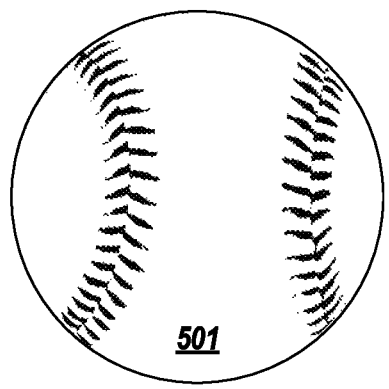
FIG. 5 illustrates an advantage of measuring a rotation of an object in flight, such as a ball, to an arbitrary seam orientation first before finding relative rotation between two images over measuring directly the rotation from an image pair.
Figure 5:
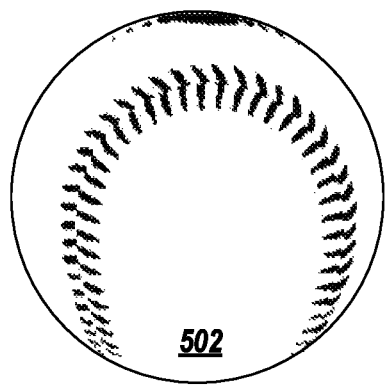
Figure 5:
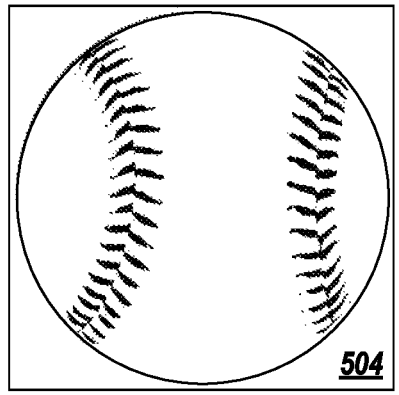
Figure 5:
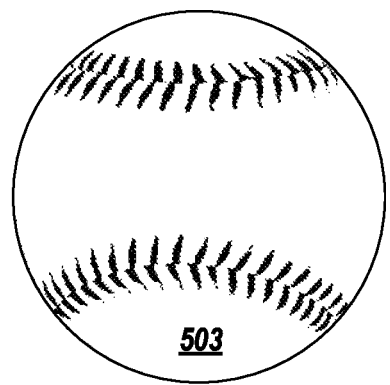

FIG. 5 illustrates an advantage of measuring a rotation of an object in flight, such as a ball, to an arbitrary seam orientation first before finding relative rotation between two images over measuring directly the rotation from an image pair. Ball images 501, 502 and 503 are 3 instances of a single ball during a flight. The ball may be rotating in the manner of rotation 130. For surface match based rotation method to be performed according to some embodiments, some amount of overlap or common area may be present between one image to another. In the case of high spin rate, which may be common in baseball and golf and other sports, the ball might have turned more than 90 degrees from one image to another. From ball image 501 to ball image 502, for example, the overlapping region may be small because the ball has rotated more than 90 degrees. Further, a rotating sphere can rotate in 3 axis: roll, pitch and yaw. If the ball image is captured at different angle the overlapping region may decrease. Thus, to increase an amount of overlap or common area between images (such as due to high spin rate or a spin in multiple directions), the camera may capture images at a higher rate, such as is illustrated in ball image 504 which may have been captured very close in time to ball image 501. In at least one embodiment, the flight monitor system 110 may monitor overlap or common area in real time and may provide feedback to the camera 105 to increase or decrease the image capture rate such that overlap or common area between successive images is near a predetermined amount. In at least one embodiment, a majority of the ball spin may be in one direction and the difference between the overlapping region between captured images may be small.

Figure 6:
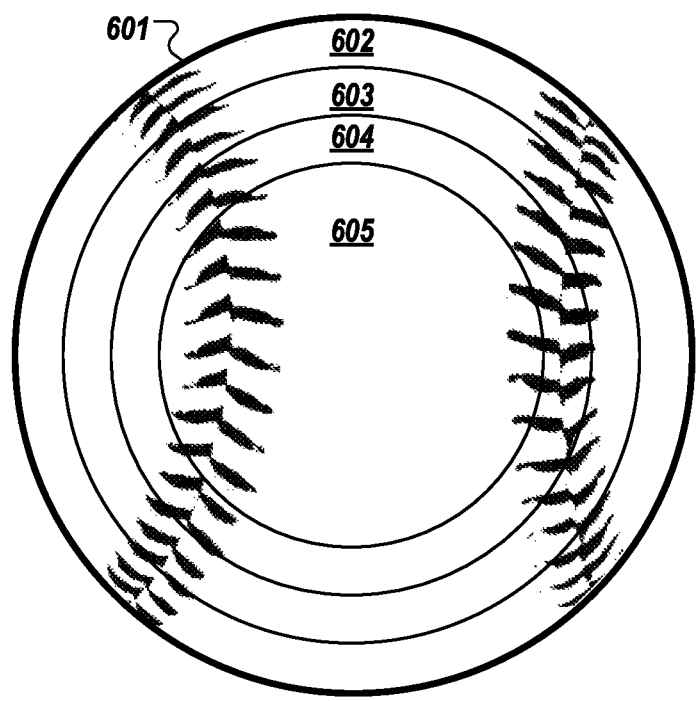
FIG. 6 illustrates an example light normalization operation of an object.

FIG. 6 illustrates an example light normalization operation of an object in an accordance with at least one embodiment. The object is illustrated as a baseball 601. The baseball 601 may be divided into bins 602, 603, 604, 605 based on distance of the pixel from the center of the baseball 601. This light normalization operation may assume the light is close to uniform on the baseball 601 and the variation of brightness on the baseball 601 may include a factor of the distance of the pixel in 3D with respect to the light source and the camera. An average intensity level of each bin 602, 603, 604, 605 may be calculated and the all the intensity value in a respective bin may be normalized by its respective average intensity level. The seam dark intensity value may not contribute significantly to the averaging because it may represent a smaller number compared to other pixels. As the edge of the ball will receive less light, the distance based normalization method may increase the contrast between the seam and the rest of the ball which is brighter. It may increase the visibility of the seam at the edges of the ball. After normalization, a single threshold value may be set to extract seam coordinates on positions that may be of varying distance from the center of the baseball 601.

In at least one embodiment, light normalization may be performed using contrast enhancement on a polar transform output. To create the polar transform output, a processor may convert an image of an object (e.g., baseball 601) into radial distance and angular displacement from x and y positions. Since the illumination of the light on the object may be a factor of the distance of a pixel from the center of the object, the polar transform output may eliminate a change of lighting due to the radial position of the pixel. Dark pixels in corner regions may be enhanced, such as be using characteristics from the surrounding pixels.

Figure 7:
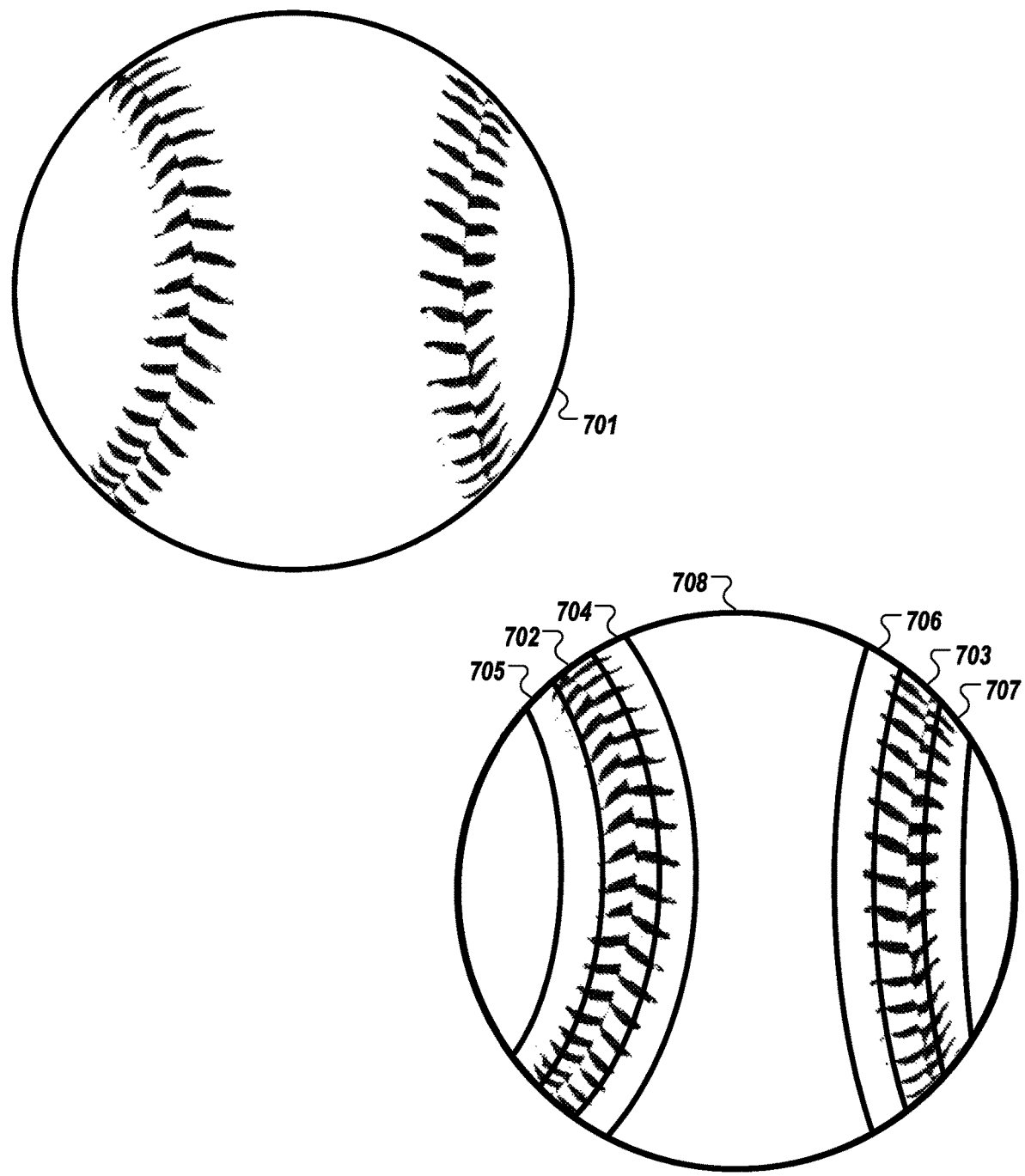
FIG. 7 illustrates an example template matching operation.

FIG. 7 illustrates an example template matching operation in an embodiment. A post processed image 701 may include an object, which is illustrated as a baseball. Image 708 includes an image template of a seam orientation. Bins 702 and 703 represent the coordinates of the seam of this orientation. Bins 704, 705, 706 and 707 are portions of the image that represent the adjacent pixels just outside the seam. The energy level of the post processed image 701 under the region 702 and 703 is measured in an embodiment. In 701, the intensity is flipped such that darker pixel in the original image will appear brighter. The seam in this case is brighter than rest of the ball. If the match is above a threshold value, the energy level under 702 and 703 will give the highest value. However, in the presence of other man made markers or blemishes on the ball, the seam might not be the only bright region in image 701. Normalization may be performed to ensure that the comparison metric is not skewed by other non-seam markers. Normalization may reduce or remove blemishes from the images of the object. This correction may be done in an embodiment by normalizing with the energy level of 704, 705, 706 and 707. The candidate that has the energy level under 702 and 703 divided by energy level of 704, 705, 706 and 707 may be the best match. This may be because if the seam matches, the energy outside the seam should be low. If the seam coordinates overlap the region of non-seam markers, the energy level on the outside will be high. The width of bins 704-706 may be chosen to be fairly narrow to increase the accuracy of normalization. In an alternative embodiment, the number of extracted pixels that overlap with bins 702 and 703 may be counted as a form of energy measurement. The processed image 701 in this case is replaced with a set of coordinates where the seam is located.

In at least one embodiment, an alternative approach to the template matching operation may include generating a template of two categories for every center point on the seam. The points are outer and inner, where the inner is considered as part of the seam and outer are the points adjacent to the seam. A center point level normalization may be performed, where the template to image fit for every center point may be calculated based on the energy of the inner pixels over the outer pixels. The center points may be aligned to obtain spatial relationship between adjacent center points. Instead of adding all inner and outer points and then doing an image wide normalization as in some approaches, this approach may use a point by point normalization.

Figure 8A:
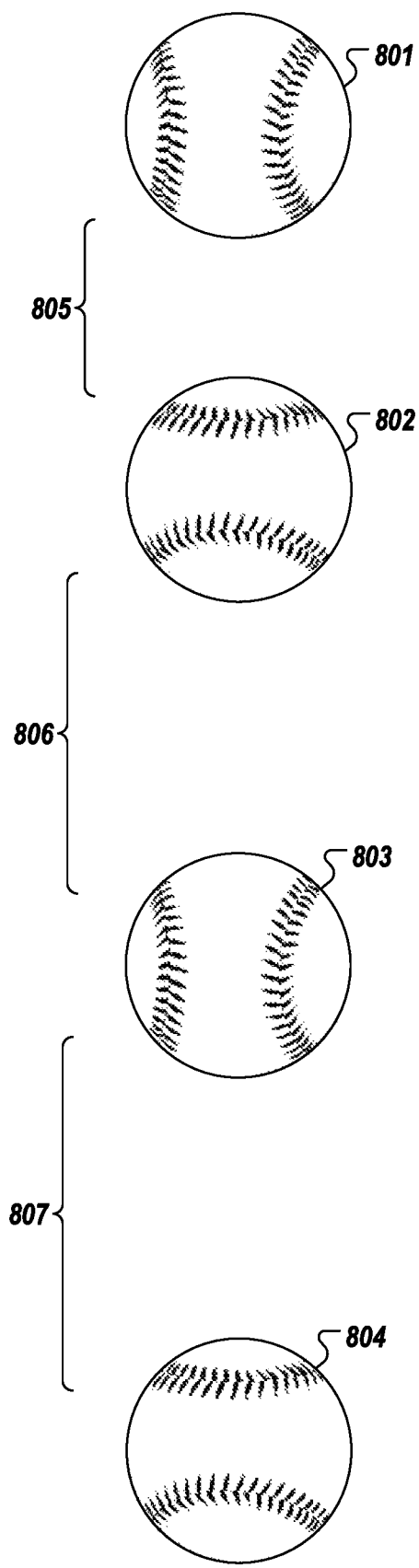
FIG. 8a illustrates a time taking strategy of a flight monitor system.

FIG. 8a illustrates a time taking strategy of a flight monitor system, such as the flight monitor system 110 of FIG. 1. When an object (e.g., a baseball) is rotating at a high rate and an image taking distance is large, images to be compared may have respective rotation of more than 180 degree. Since the object may rotate in two directions given the same tilt axis, the object may rotate less than 180 degrees between images to avoid ambiguity. In ball images 801 to 802, a time separation between capturing the ball images 801, 802 is small enough such that the ball may have rotated less than 180 degrees. The flight monitor system 110 may measure the coarse spin rate and spin axis. The rotation measured from images 801 to 803 and 804 may then be used to achieve higher resolution in spin rate measurement based on the coarse spin direction and spin number measured in the closest two images. This way the flight monitor system 110 may measure the spin axis and spin rate in a manner that may reduce ambiguity and may increase accuracy. In an embodiment, at least one set of images are taken close enough the highest rotating ball would have rotated less than 180 degree from one to the other.

Figure 8B:
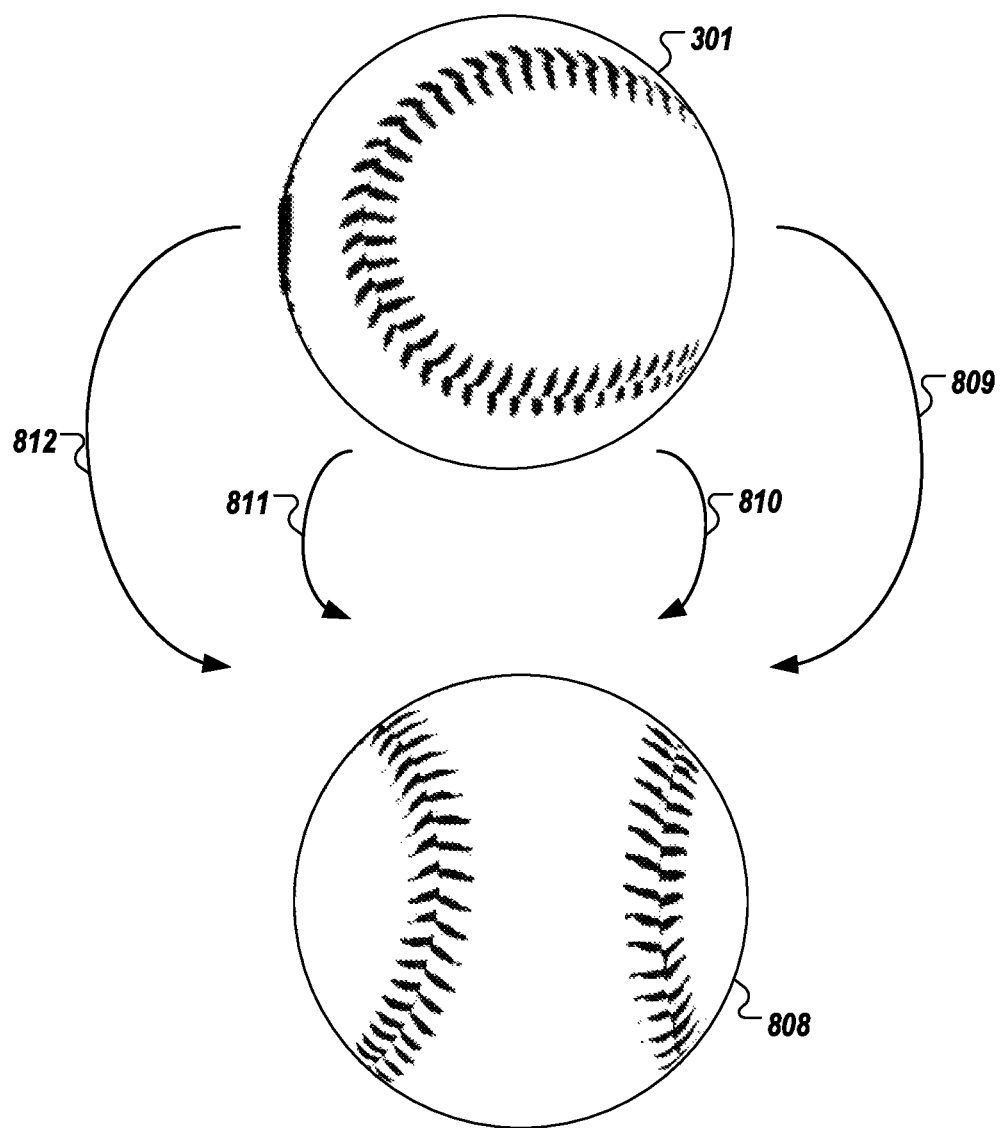
FIG. 8b illustrates an example solution to a possible complication that may be introduced due to a symmetrical nature of an object, such as a baseball.

FIG. 8b illustrates a possible complication that may be introduced due to a symmetrical nature of an object, such as a baseball. A baseball, for example, may have four identical seam orientations to every face that may be captured by a camera. Given the arbitrary shape 301, there may be four seam orientations 810-812 that may yield image 808. In an embodiment, an image pair may generate four relative spin rates and spin axes. The correct spin rate and spin axis may be determined by the most common spin rate and spin axis among the ones measured in all of the image pairs.

Figure 8C:
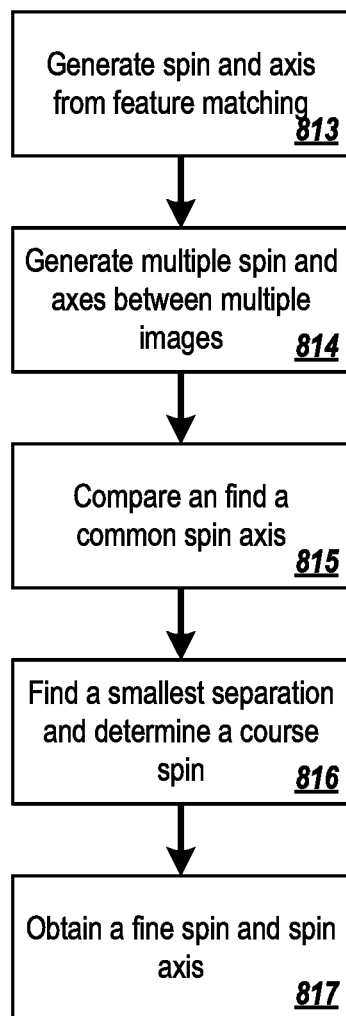
FIG. 8c illustrates a spin axis and spin rate measurement method.

FIG. 8c illustrates a spin axis and spin rate measurement method in an embodiment. The method may be performed by processing logic associated with the flight monitor system 110 of FIG. 1, as discussed above. The processing logic may generate a unique spin number in x, y and z axis by seam matching at block 813. The relative spin numbers are then generated by the processing logic at block 814 between an image pair. Multiple other spin rates and spin axes may then be generated by the processing logic based on a known symmetry of the ball. The processing logic may compare and find common spin axes at block 815. The correct spin axis is the spin axis that occurs that most number of times across measurement from different image pair. The processing logic may select an image pair with the smallest separation to give the coarse spin that may have reduced ambiguity at block 816. The more accurate spin rate is then measured from image pair with bigger separation for better spin rate accuracy. At block 817, the processing logic may 817 obtain a fine spin and a spin axis of the object. In at least one embodiment, the processing logic may obtain the fine spin and spin axis by measuring and averaging spin from one or more image pairs. The one or more image pairs may include a bigger separation image pair. In at least one embodiment, the processing logic measures the spin and spin axis by finding the best match of the seam orientation with a template database. The processing logic processing logic may also recreate how the object and features of the object may appear from the camera point of view in numerous instances. Thus, the processing logic can generate templates for the database that may show exactly the features (e.g., baseball seams) may be oriented for every time point during flight. The processing logic may also generate a model of the object to be presented in a user interface. The model of the object may spin like how it rotated in the actual flight.

Figure 9:
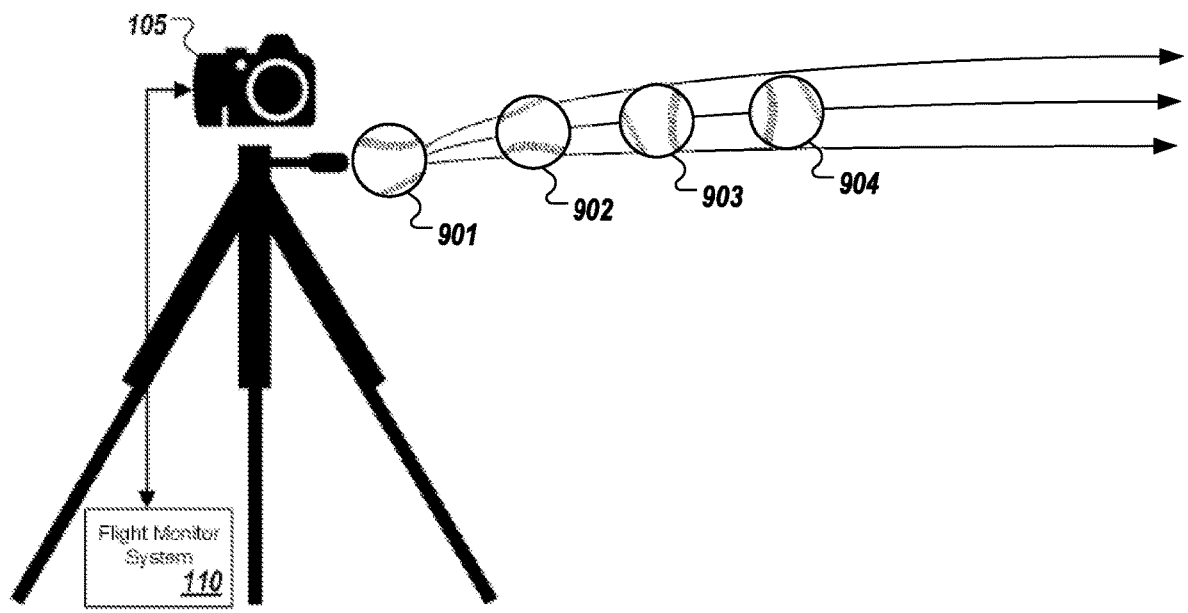
FIG. 9 illustrates a system for fine tuning to obtain a more accurate spin and spin axis.

FIG. 9 illustrates a system for fine tuning to obtain a more accurate spin and spin axis. The spin rate and spin axis measured in block 817 along with other flight parameters are used to generate the flight model of the ball in flight. Based on the position of the ball in positions 901, 902, 903 and 904, the best fitting flight model may be associated with the most accurate spin rate and spin axis. The flight model that projected the ball with the smallest error with respect to ball position 901-904 is the best fitting flight model. In an alternative embodiment, the radar data may be used to compare against different fit of the flight model.

Figure 10:
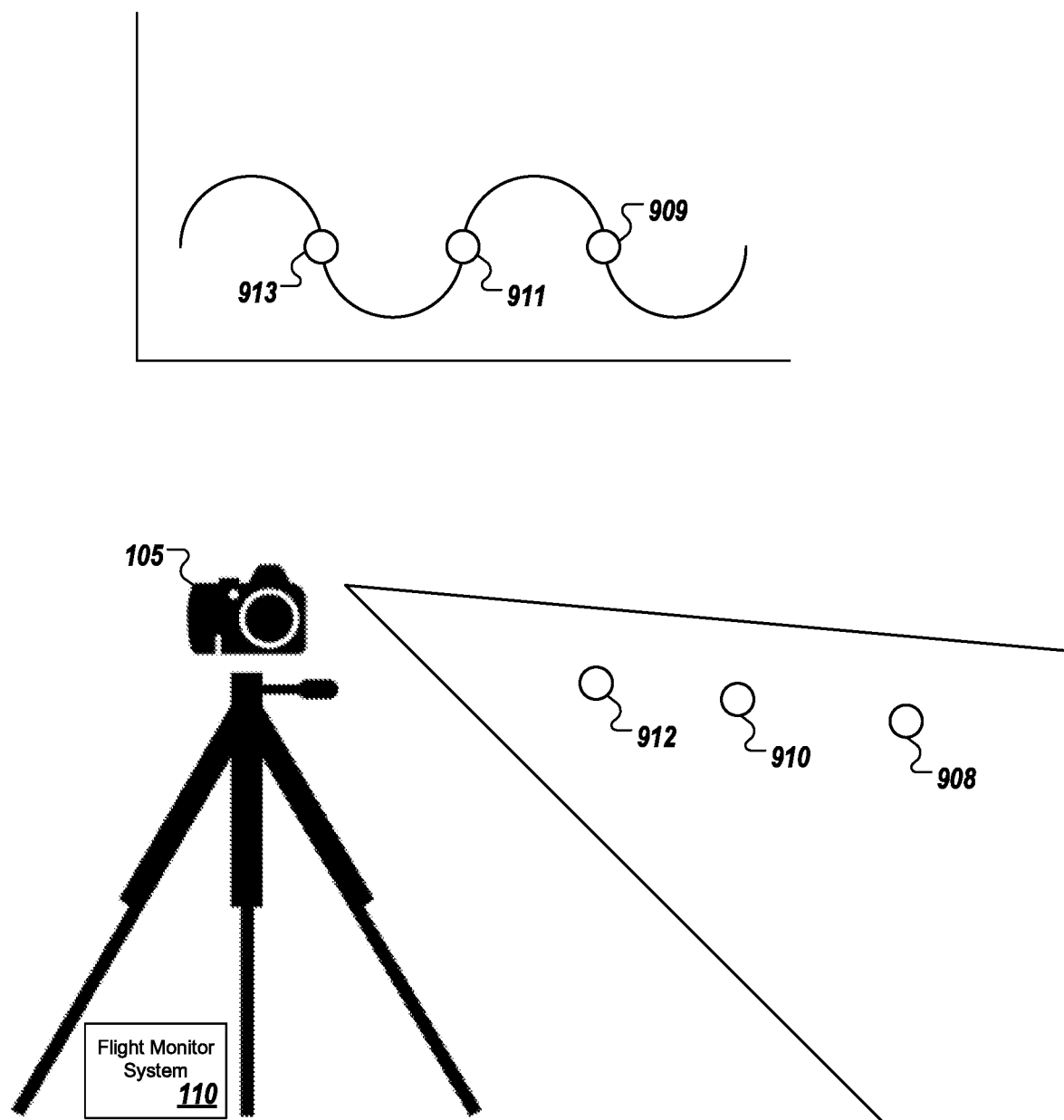
FIG. 10 illustrates a photo taking operation where man made light is the main illuminating source.

FIG. 10 illustrates a photo taking operation where man made light is the main illuminating source. When used in a room with fluorescent light, the light flickering may cause off-sync brightness in each image. This may have an impact on various operations, such as background subtraction. The circle 912 illustrates the brightness variation of the room over time. The periodic nature is due to the flickering of fluorescent light. The images may be captured in-sync so that they are captured at the same phase of the brightness relative to time. In an example, an image of ball 908 is captured at time point 909, and the image of ball 910 is captured at point 911. Because both 909 and 911 lie on the same phase in the brightness plot, both images 908 and 910 may have a similar background of the same lighting intensity. In an embodiment, images are not only taken in one phase but a collection of multiple images in different phase. These images are grouped according to the phase for background subtraction.

Figure 11:
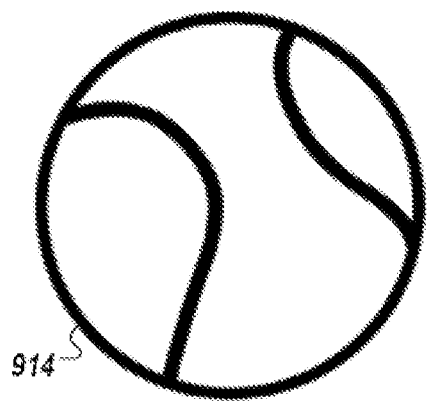
FIG. 11 illustrates an alternative embodiment where the disclosed invention may be used in other sports and for other types of balls.
Figure 11:
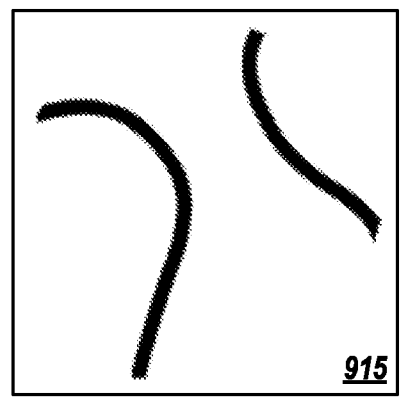
Figure 11:
Figure 11:
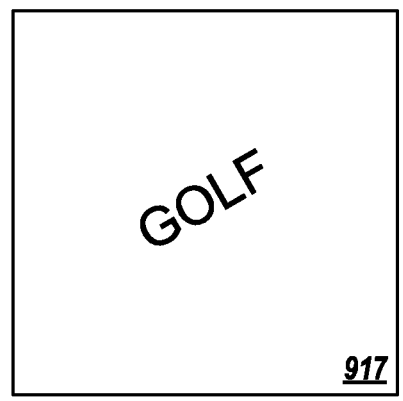

FIG. 11 illustrates an alternative embodiment where the disclosed invention may be used in other sports and for other types of balls. Ball 914 is a tennis ball and ball 915 is an image of a seam generated from a tennis ball. The same seam tracing and spin axis selection strategy may be employed on tennis ball. Ball 916 is a golf ball where a dimple pattern and a marker (e.g., "GOLF") is known and available. Different orientations of the golf ball may be is generated, as illustrated in image 917 and compared as in block 817.

Figure 12:
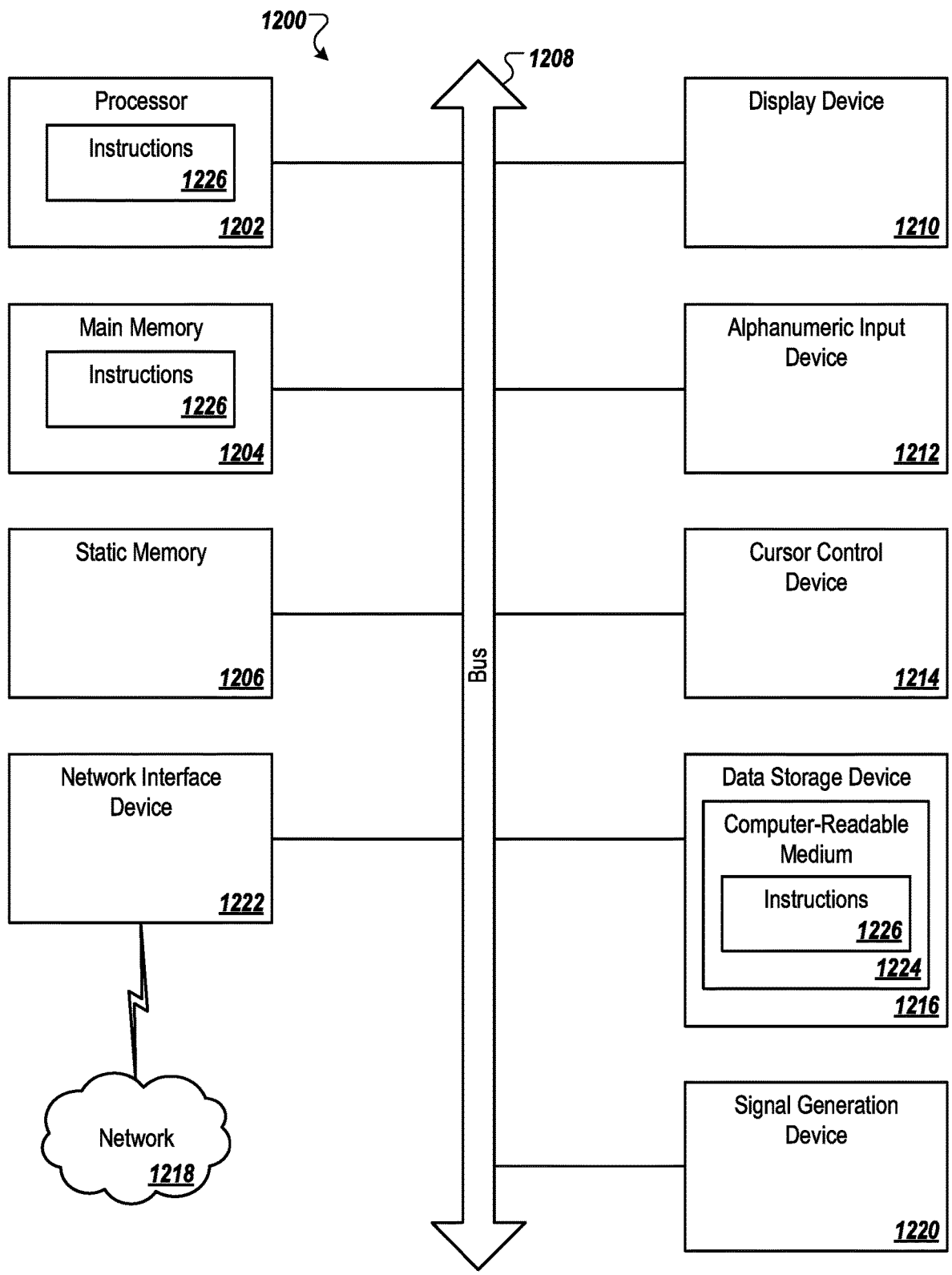
FIG. 12 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 12 illustrates a diagrammatic representation of a machine in the example form of a computing device 1200 within which a set of instructions, for causing the machine to perform any one or more of the methods discussed herein, may be executed. The computing device 1200 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1200 includes a processing device (e.g., a processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)) and a data storage device 1216, which communicate with each other via a bus 1208.

Processing device 1202 represents one or more general-purpose processing devices such as a microprocessor, central processing unit, or the like. More particularly, the processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also include one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computing device 1200 may further include a network interface device 1222 which may communicate with a network 1218. The computing device 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker). In one implementation, the display device 1210, the alphanumeric input device 1212, and the cursor control device 1214 may be combined into a single component or device (e.g., an LCD touch screen).

The data storage device 1216 may include a computer-readable storage medium 1224 on which is stored one or more sets of instructions 1226 (e.g., flight monitor system 110) embodying any one or more of the methods or functions described herein. The instructions 1226 may also reside, completely or at least partially, within the main memory 1204 and/or within the processing device 1202 during execution thereof by the computing device 1200, the main memory 1204 and the processing device 1202 also constituting computer-readable media. The instructions may further be transmitted or received over a network 1218 via the network interface device 1222.

While the computer-readable storage medium 1226 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In at least one embodiment, a method may include measuring a rotation of an object in flight by comparing a region of interest on a surface of the object facing a camera to a predefined template. The method may also include choosing a correct rotation and axis in multiple image pairs due to object symmetrical property by choosing a common rotation axis among different image pairs. The method may further include timing of an image capture operation of the object in flight to reduce repeating of full or half rotations. The method may include timing of the image capture operation of the object in flight to reduce ambiguity of rotation by ensuring a closest image pair in time has the object rotate less than half a circle. The method may also include using seam orientation for flight path reconstruction improvement.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, in some embodiments, the method 1300 may include correcting one or more of the speed, the elevation angle, and the azimuth angle based on a measured system tilt. Additionally or alternatively, the method 1300 may include extracting sufficient pixels from the images for marker matching. The marker matching may include identifying one or more natural markers on the object. Additionally or alternatively, the method 1300 may include fitting a polar transform of an image pair in one dimension for measuring the spin rate and/or spin axis. Additionally or alternatively, the method 1300 may include performing a manufacture calibration and/or performing an auto calibration while capturing the images.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
    generating a set of template images including a first template image and a second template image, each template image in the set of template images including a mathematically generated orientation for an object;
    storing the set of template images to a template database;
    identifying the object in-flight in an image;
    identifying a feature orientation on the object that is in a first spatial position, wherein the feature orientation on the object appears smaller in size than the object;
    identifying a region of interest that includes the feature orientation;
    generating a cropped image that includes the entire region of interest and excludes at least a portion of the object;
    accessing the set of template images in the template database;
    comparing the feature orientation on the object of the cropped image with the set of template images;
    using the template images to identify first coordinates and second coordinates of the first spatial position and a subsequent, second spatial position, respectively; and
    generating a spin value for the object based on the first coordinates and the second coordinates.

2. The method of claim 1, wherein generating the cropped image includes cropping the image to a tightest possible fitting rectangle that includes the region of interest.

3. The method of claim 1 further comprising normalizing the image to reduce at least one blemish depicted on the object in the image.

4. The method of claim 1 further comprising performing enhancements to the image prior to comparing the feature orientation with the set of template images, wherein the enhancements include at least one of: changing a contrast of the image, an adjustment of a histogram of the image, or a binarization of the image.

5. The method of claim 1 further comprising:
    determining that the object includes at least one symmetrical feature; and generating a common rotation rate and rotation axis for a pair of images that each depict the at least one symmetrical feature.

6. The method of claim 1 further comprising generating a simulated flight model of the object based at least in part on the spin value for the object.

7. The method of claim 6, wherein the spin value for the object is a course spin value, the method further comprising determining a fine spin value to tune the simulated flight model.

8. A system comprising:

a memory; and a processor operatively coupled to the memory, the processor being configured to execute operations that, when executed, cause the processor to:

generate a set of template images including a first template image and a second template image, each template image in the set of template images including a mathematically generated orientation for an object;

store the set of template images to a template database;

identify the object in-flight in an image;

identify a feature orientation on the object that is in a first spatial position;

identify a region of interest that includes the feature orientation;

generate a cropped image that includes the entire region of interest and excludes at least a portion of the object;

access the set of template images in the template database;

compare the feature orientation on the object of the cropped image with the set of template images;

use the template images to identify first coordinates and second coordinates of the first spatial position and a subsequent, second spatial position, respectively; and generate a spin value for the object based on the first coordinates and the second coordinates.

9. The system of claim 8, wherein generating the cropped image includes cropping the image to a tightest possible fitting rectangle that includes the region of interest.

10. The system of claim 8, the operations further to cause the processor to normalize the image to reduce at least one blemish depicted on the object in the image.

11. The system of claim 8, the operations further to cause the processor to perform enhancements to the image prior to comparing the feature orientation with the set of template images, wherein the enhancements include at least one of: changing a contrast of the image, an adjustment of a histogram of the image, or a binarization of the image.

12. The system of claim 8, the operations further to cause the processor to:

determining that the object includes at least one symmetrical feature; and generating a common rotation rate and rotation axis for a pair of images that each depict the at least one symmetrical feature.

13. The system of claim 8, the operations further to cause the processor to generate a simulated flight model of the object based at least in part on the spin value for the object.

14. The system of claim 13, wherein the spin value for the object is a course spin value, the operations further to cause the processor to determine a fine spin value to tune the simulated flight model.

15. A non-transitory computer-readable medium having encoded therein programming code executable by a processor to perform operations comprising:

generating a set of template images including a first template image and a second template image, each template image in the set of template images including a mathematically generated orientation for an object;

storing the set of template images to a template database;

identifying the object in-flight in an image;

identifying a feature orientation on the object that is in a first spatial position;

identifying a region of interest that includes the feature orientation;

generating a cropped image that includes the entire region of interest and excludes at least a portion of the object;

accessing the set of template images in the template database;

comparing the feature orientation on the object of the cropped image with the set of template images;

using the template images to identify first coordinates and second coordinates of the first spatial position and a subsequent, second spatial position, respectively; and generating a spin value for the object based on the first coordinates and the second coordinates.

16. The non-transitory computer-readable medium of claim 15, wherein generating the cropped image includes cropping the image to a tightest possible fitting rectangle that includes the region of interest.

17. The non-transitory computer-readable medium of claim 15, the operations further comprising normalizing the image to reduce at least one blemish depicted on the object in the image.

18. The non-transitory computer-readable medium of claim 15, the operations further comprising:

determining that the object includes at least one symmetrical feature; and generating a common rotation rate and rotation axis for a pair of images that each depict the at least one symmetrical feature.

19. The non-transitory computer-readable medium of claim 15, the operations further comprising generating a simulated flight model of the object based at least in part on the spin value for the object.

20. The non-transitory computer-readable medium of claim 19, wherein the spin value for the object is a course spin value, the operations further comprising determining a fine spin value to tune the simulated flight model.

* * * * *